United States Patent
Hisajima et al.

(10) Patent No.: US 10,093,338 B2
(45) Date of Patent: *Oct. 9, 2018

(54) STEERING WHEEL

(71) Applicant: Autoliv Development AB, Vårgårda (SE)

(72) Inventors: Takayuki Hisajima, Yokohama (JP); Toshiaki Ebana, Yokohama (JP); Yousuke Kato, Yokohama (JP); Yui Sekiya, Yokohama (JP); Yukinori Midorikawa, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 138 days.

This patent is subject to a terminal disclaimer.

(21) Appl. No.: 14/776,275

(22) PCT Filed: Mar. 10, 2014

(86) PCT No.: PCT/JP2014/056213
§ 371 (c)(1),
(2) Date: Sep. 14, 2015

(87) PCT Pub. No.: WO2014/142083
PCT Pub. Date: Sep. 18, 2014

(65) Prior Publication Data
US 2016/0039449 A1    Feb. 11, 2016

(30) Foreign Application Priority Data

Mar. 14, 2013  (JP) .................................. 2013-052290

(51) Int. Cl.
*H05B 3/20*     (2006.01)
*H05B 3/34*     (2006.01)
(Continued)

(52) U.S. Cl.
CPC .............. *B62D 1/06* (2013.01); *B62D 1/065* (2013.01); *H05B 3/20* (2013.01); *H05B 3/54* (2013.01); *H05B 2203/017* (2013.01)

(58) Field of Classification Search
None
See application file for complete search history.

(56) References Cited

U.S. PATENT DOCUMENTS 4,547,655 A * 10/1985 Kurata .................. B62D 1/065
                                                     219/204
6,365,875 B1 * 4/2002 Kreuzer .................. B62D 1/06
                                                     219/204
(Continued)

FOREIGN PATENT DOCUMENTS

CN         102781762 A       11/2012
EP         2 539 202          1/2013
(Continued)

OTHER PUBLICATIONS

PCT International Search Report dated Apr. 17, 2014.
Thai, Cao Minh, et al., "Recycling Process for Polyurethane Resin", Toshiba Review, vol. 56, No. 8 (2001), pp. 46-49.

*Primary Examiner* — Joseph M Pelham
(74) *Attorney, Agent, or Firm* — Brinks Gilson & Lione (57) ABSTRACT

A steering wheel that enables heat to be efficiently conducted to a steering wheel outer covering. The steering wheel includes: a core; a spacer member arranged around an outer periphery of a rim portion of the core; a temperature adjusting element provided on the spacer member; and a resin layer formed to cover an outside portion of the spacer member. The spacer member keeps at least a part of the temperature adjusting element away from the core.

18 Claims, 7 Drawing Sheets

(51) Int. Cl.
    *B62D 1/06*           (2006.01)
    *H05B 3/54*           (2006.01)

(56) References Cited

U.S. PATENT DOCUMENTS

| | | |
|---|---|---|
| 9,173,249 B2 | 10/2015 | Morita |
| 2002/0033389 A1* | 3/2002 | Sugiyama ............... B62D 1/065 219/204 |
| 2003/0111453 A1* | 6/2003 | Haag ....................... B62D 1/065 219/204 |
| 2003/0218004 A1* | 11/2003 | Yoneyama ............... B62D 1/065 219/528 |
| 2010/0288073 A1* | 11/2010 | Shin ........................ B29C 44/08 74/552 |
| 2011/0073582 A1* | 3/2011 | Morita .................... B62D 1/065 219/204 |
| 2012/0129623 A1* | 5/2012 | Gill ........................ A63B 53/14 473/300 |
| 2012/0312796 A1 | 12/2012 | Cho |
| 2013/0056455 A1* | 3/2013 | Onishi .................... B62D 1/065 219/204 |
| 2013/0062329 A1 | 3/2013 | Morita |
| 2015/0122790 A1* | 5/2015 | Yamada ................. B62D 1/065 219/204 |
| 2015/0344061 A1* | 12/2015 | Uematsu ................ B62D 1/065 219/204 |
| 2015/0367875 A1* | 12/2015 | Nonoyama ............ B62D 1/065 219/204 |
| 2016/0039449 A1 | 2/2016 | Hisajima et al. |
| 2016/0311457 A1* | 10/2016 | Kato ....................... B62D 1/065 |

FOREIGN PATENT DOCUMENTS

| | | | |
|---|---|---|---|
| JP | H 11-268652 A | | 10/1999 |
| JP | 2007-153026 A | | 6/2007 |
| JP | 2013-060149 A | | 4/2013 |
| JP | 2013-520366 | | 6/2013 |
| JP | 2013-129238 | | 7/2013 |
| JP | 2013-139203 A | | 7/2013 |
| JP | 2013139203 A | * | 7/2013 |
| JP | 2016094191 A | * | 5/2016 |
| WO | WO 2011/105765 A2 | | 9/2011 |
| WO | WO 2014/142083 A1 | | 9/2014 |

* cited by examiner

STEERING WHEEL

CROSS REFERENCE TO RELATED APPLICATIONS

This application claims priority to Japanese Patent Application No. 2013-052290, filed on Mar. 14, 2013 and PCT International Patent Application No. PCT/JP2014/056213, filed on Mar. 10, 2014.

FIELD OF THE INVENTION

The present invention relates to a structure of a motor vehicle steering wheel with a temperature adjusting function (heater and/or cooler function).

DESCRIPTION OF THE RELATED ART

In recent years, steering wheels with a temperature adjusting function (heater and/or cooler function) have been adopted for automobiles and the like. In common steering wheels, a foamed urethane layer is formed outside a rim portion of a metallic core. In some steering wheels, the urethane layer is externally covered with leather. For example, a structure has been proposed in which a heater element is arranged outside the core in order to apply a heater function to the steering wheel. A conventional steering wheel with a heater function is disclosed, for example, in Japanese Patent Application Laid-open No. 2007-153026.

In the steering wheel with the heater function, it is important to efficiently transfer heat to a steering outer covering. There is also a demand to minimize an increase in costs resulting from the addition of the heater function.

SUMMARY OF THE INVENTION

The present invention has been developed in view of the above-described problems. An object of the present invention is to provide a steering wheel that enables heat (warmth or cold) to be efficiently transferred to a steering outer covering.

Another object of the present invention is to provide a steering wheel that enables minimization of an increase in costs resulting from addition of a temperature adjusting function.

To accomplish the object, a steering wheel according to the present invention includes: a core; a spacer member arranged around an outer periphery of a rim portion of the core; a temperature adjusting element provided on the spacer member; and a resin layer formed to cover an outside portion of the spacer member. The spacer member keeps at least a part of the temperature adjusting element away from the core. For example, the temperature adjusting element may be a heating unit provided outside the frame structure.

In the present invention configured as described above, the spacer member keeps at least a part of the temperature adjusting element away from the core, allowing avoidance of a situation where most of heat generated by the temperature adjusting element is conducted toward the core, which has a high heat conductivity. Thus, the heat can be efficiently conducted to the steering outer covering. Furthermore, molding of the resin layer can be completed during one step, enabling minimization of an increase in costs resulting from addition of the temperature adjusting function.

The spacer member may have a framework-like frame structure. The resin layer may be formed to lie between the core and the frame structure and to cover an outside portion of the frame. In this case, when a foamed resin layer is molded, the resin easily reaches the core through a gap in the frame structure, leading to simplification of manufacturing steps.

An electric current may be passed through the frame structure to generate heat. The frame structure itself may be used as a heater element. In this case, the heater element may be omitted, allowing simplification of the structure and the manufacturing steps.

The spacer member may be a flexible cushion layer. A heating unit may be provided outside the cushion layer as the temperature adjusting element. In this case, the resin layer may be formed to cover an outside portion of the cushion layer. In such an aspect, the core is covered with the resin layer and the cushion layer, both of which are flexible. Thus, the steering wheel can be made to feel soft. Furthermore, simplified manufacturing steps and reduced material costs are expected.

DESCRIPTION OF THE PREFERRED EMBODIMENTS

Figure 1:
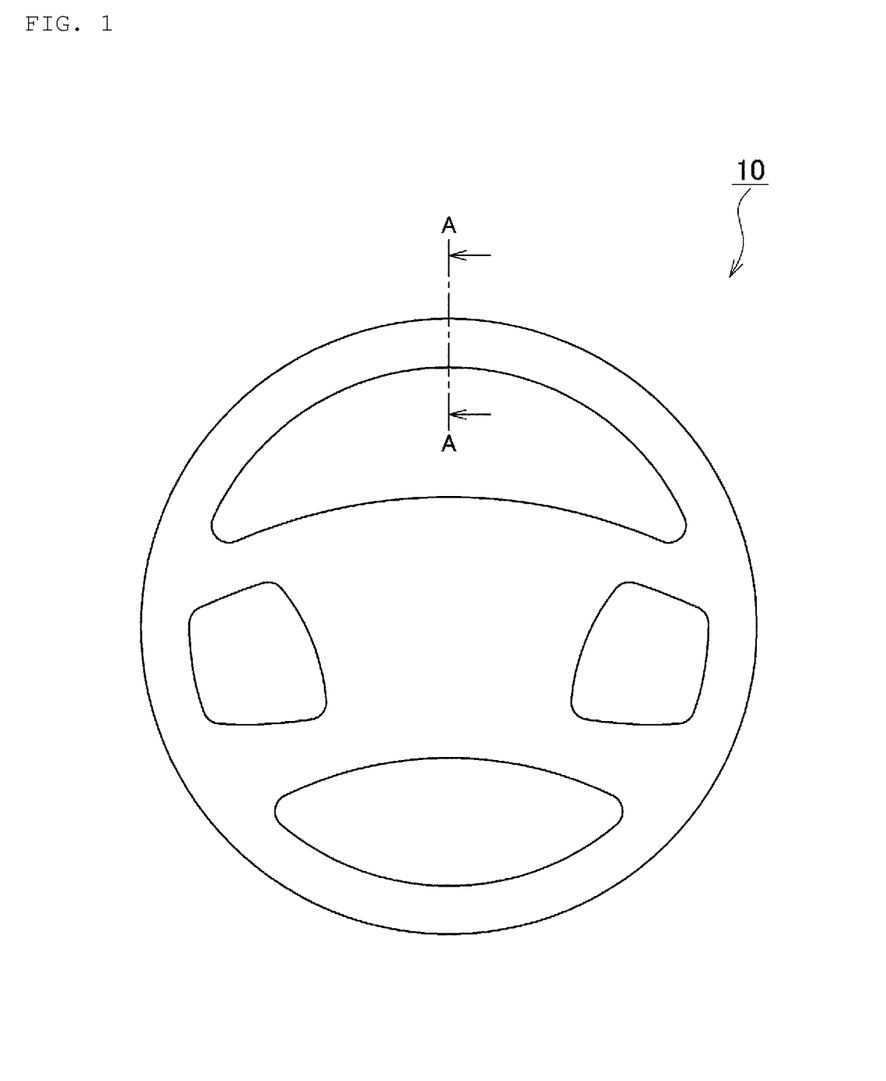
FIG. 1 is a plan view depicting a steering wheel according to the present invention.
Figure 2:
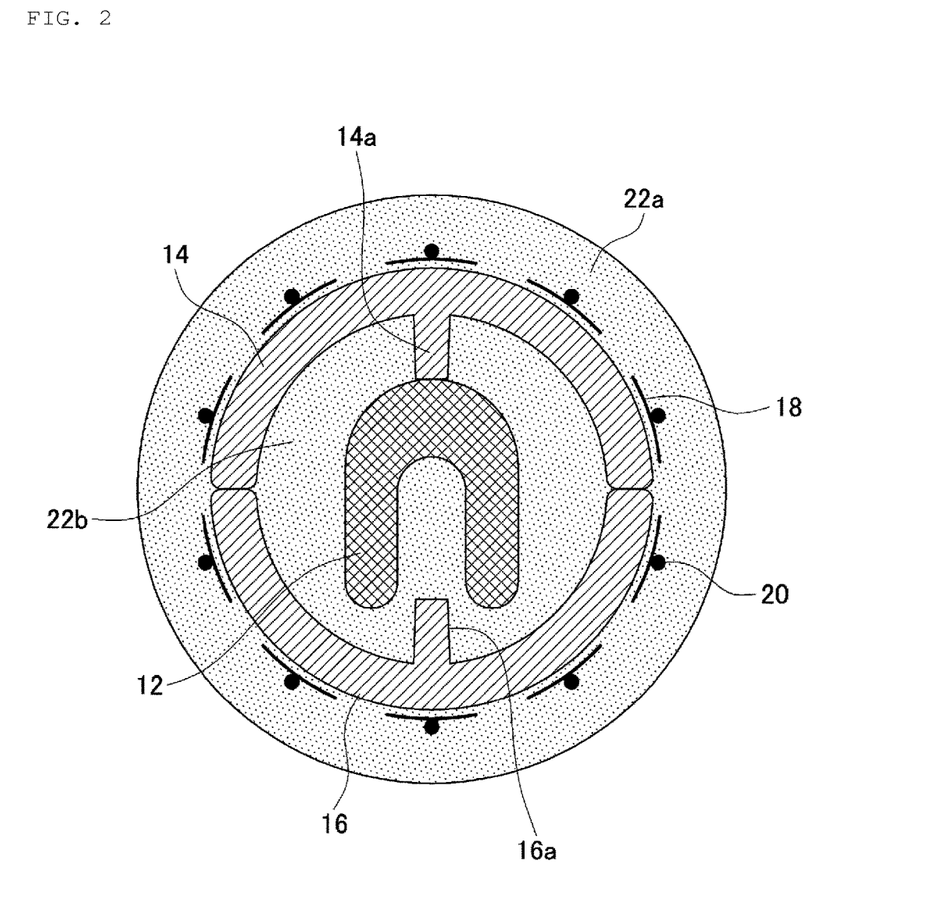
FIG. 2 is a sectional view taken along line A-A in FIG. 1.
Figure 3:
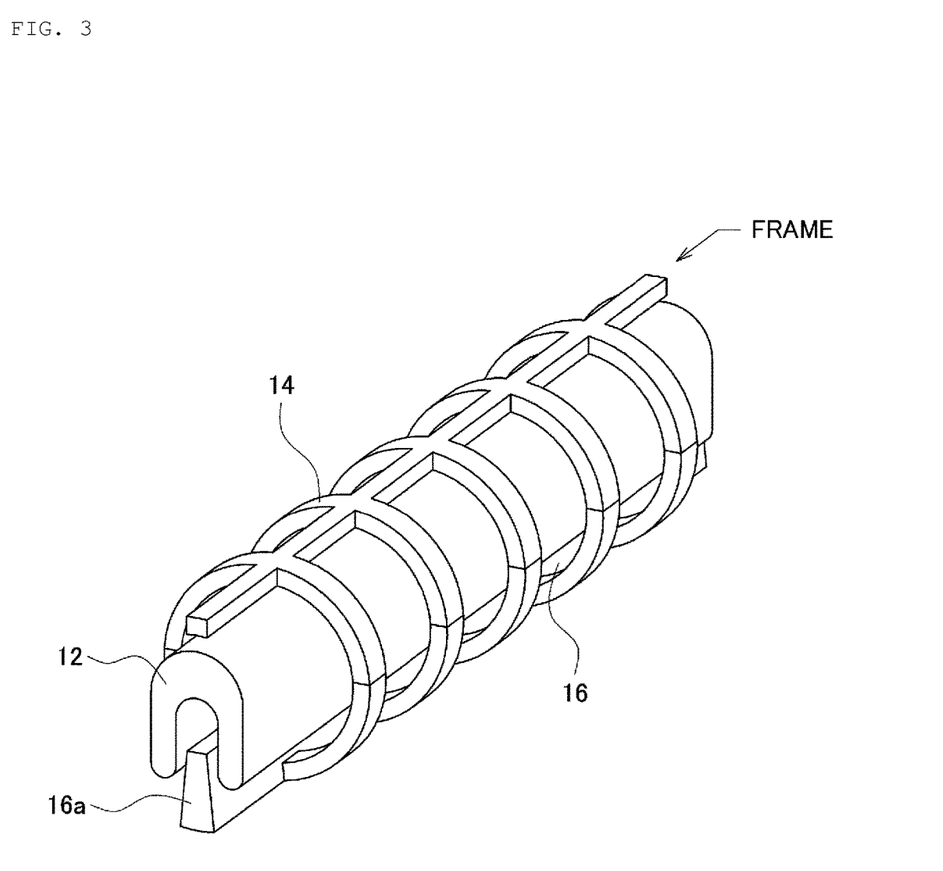
FIG. 3 is a perspective view illustrating a manufacturing step for a steering wheel according to an embodiment of the present invention depicted in FIG. 1 and FIG. 2.
Figure 4:
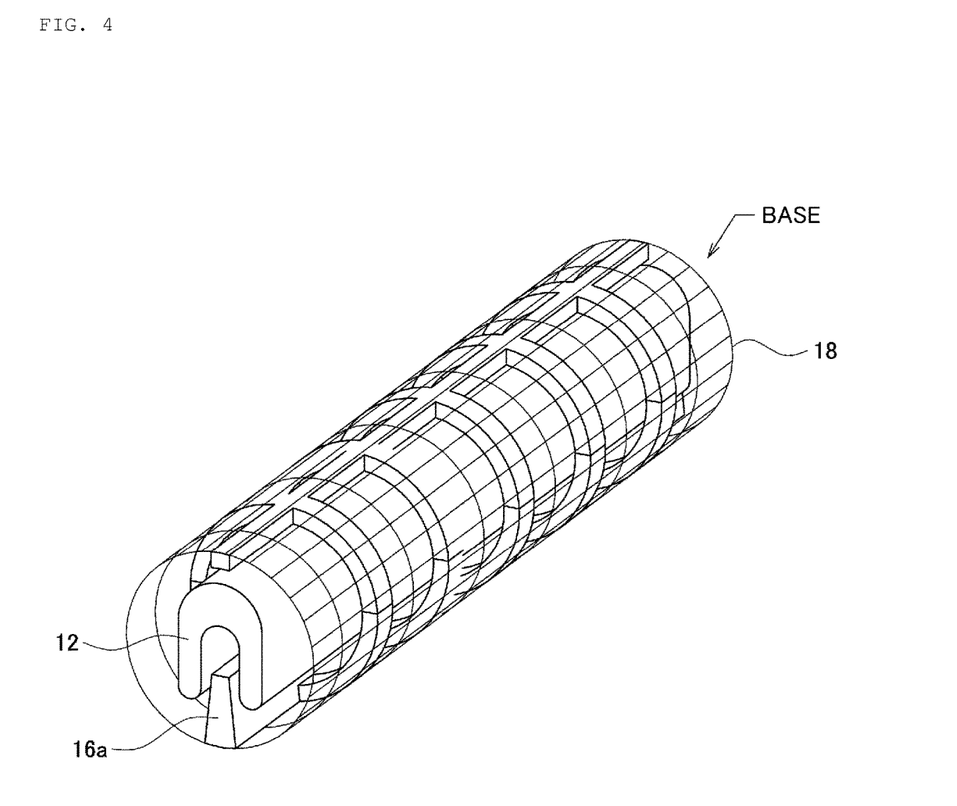
FIG. 4 is a perspective view illustrating a manufacturing step for the steering wheel according to the embodiment of the present invention depicted in FIG. 1 and FIG. 2.
Figure 5:
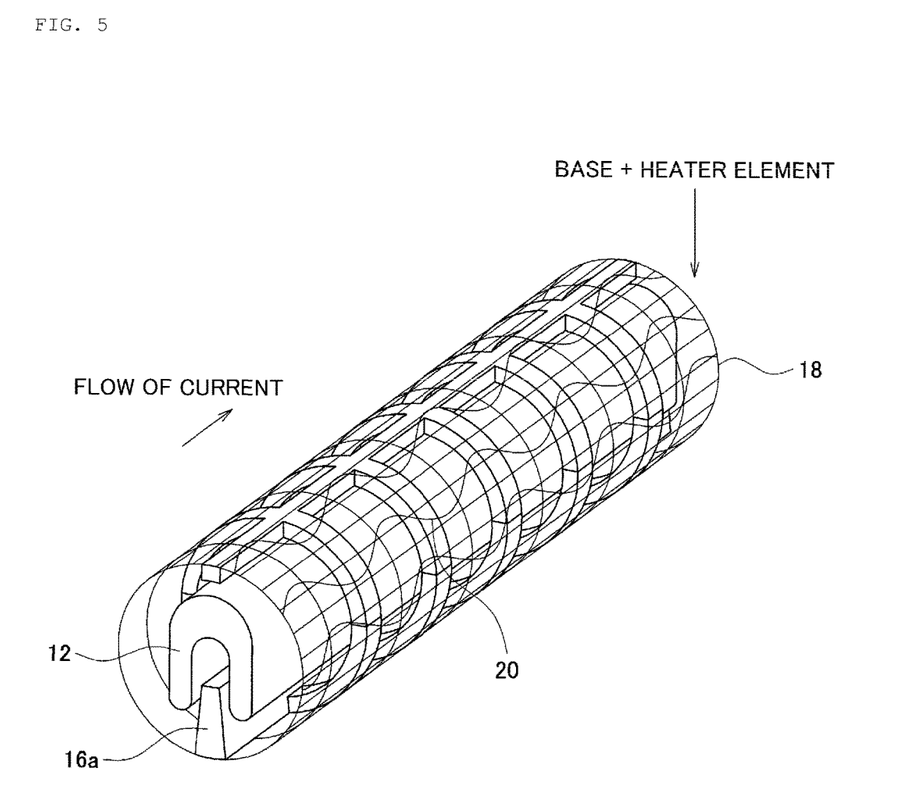
FIG. 5 is a perspective view illustrating a manufacturing step for the steering wheel according to the embodiment of the present invention depicted in FIG. 1 and FIG. 2.

Embodiments of the present invention will be described below with reference to the drawings. FIG. 1 is a plan view depicting a steering wheel 10 according to the present invention. FIG. 2 is a sectional view taken along a direction A-A in FIG. 1. FIGS. 3 to 5 are perspective views illustrating manufacturing steps for the steering wheel according to the embodiment of the present invention, as shown in FIG. 1 and FIG. 2. The steering wheel according to the present invention has a heater function and includes a core 12 formed by die-casting aluminum or magnesium, frame structures 14 and 16 arranged around an outer periphery of a rim portion of the core 12 and serving as spacer members, a heater element 20 provided on the frame structures 14 and 16, a resin layer (foamed urethane) 22a formed to cover outside portions of the frame structures 14 and 16, and a resin layer (foamed urethane) 22b enclosed in a gap between the core 12 and each of the frame structures 14 and 16.

As depicted in FIG. 3, the frame structures 14 and 16 are rib-like members with the same sectional shape and may be formed of metal, resin, or the like. A protruding portion 14a extending toward the center of the rim is formed in the center of the upper frame structure 14 and contacts an upper end of the core 12. On the other hand, a protruding portion 16*a* extending toward the center of the rim is formed in the center of the lower frame structure 16 and extends into a recess portion of the core 12. The frame structures 14 and 16 form spaces around the core 12 to locate the heater element 20 away from the core 12. The heights of the protrusions 14*a* and 16*a* of the frame structures 14 and 16 may be set as needed in accordance with the sizes of the gaps (spaces) formed around the core 12. The frame structures 14 and 16 are not limited to rib-like structures but may have other shapes as long as spaces are formed around the core 12. To allow resin to be subsequently enclosed around the core 12, it is important to mold the frame structures 14 and 16 such that the frame structures 14 and 16 have sufficiently large voids.

Metal wiring that generates heat when an electrical current is passed through the metal wiring may be adopted as the heater element 20. The heater element 20 may be arranged outside a mesh 18 serving as a base. The mesh 18 may be configured to cover the entire rim portion, including the frame structures 14 and 16 shown in FIG. 4. The mesh 18 may be molded using, for example, metal or resin. As is the case with the frame structures 14 and 16, to allow resin to be subsequently enclosed around the core 12, it is important to mold the mesh 18 such that the mesh 18 has sufficiently large voids (mesh).

To manufacture the steering wheel 10 according to the present embodiment, the frame structures 14 and 16 are arranged outside the core 12 as depicted in FIG. 3. Subsequently, as depicted in FIG. 4, the mesh 18 is placed so as to cover the outside of the frame structures 14 and 16. Then, as depicted in FIG. 5, the heater element 20 is laid over the mesh 18. Then, the foamed resins 22*a* and 22*b* are simultaneously formed between the core and each of the frame structures 14 and 16 (22*b*) and outside the frame structures 14 and 16 (22*a*).

In the present embodiment configured as described above, the frame structures 14 and 16 keep the heater element 20 away from the core 12 to allow avoidance of a situation where most of heat generated by the heater element 20 is conducted toward the core 12, which has a high heat conductivity. Thus, the heat can be efficiently conducted to a steering outer covering (22*a*). That is, the steering wheel 10 can be efficiently warmed (cooled) with reduced electric power. Furthermore, molding of the resin layers 22*a* and 22*b* can be completed during one step, allowing minimization of an increase in costs resulting from addition of the heater function.

Figure 6:
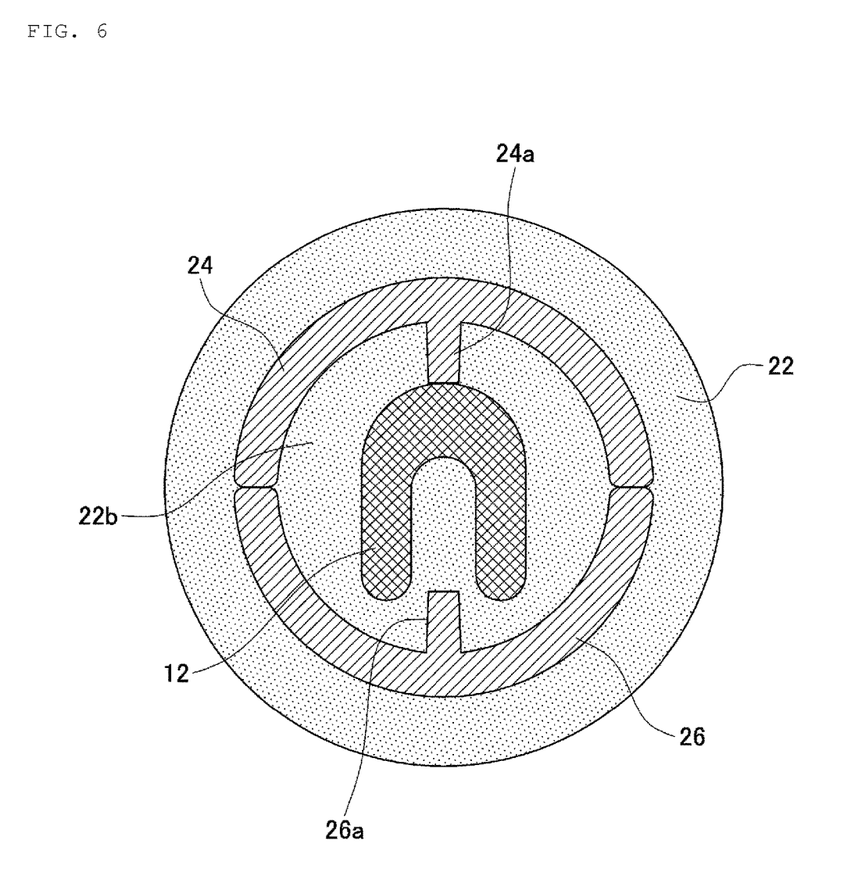
FIG. 6 is a sectional view of a steering wheel according to another embodiment of the present invention, corresponding to a cross section taken along a direction A-A in FIG. 1.

FIG. 6 is a sectional view of a steering wheel according to another embodiment of the present invention, and corresponds to a cross section in the direction A-A in FIG. 1. In a structure in the present embodiment, frame structures 24 and 26 themselves are used as heater elements, and a current is passed directly through the structures 24 and 26 to generate heat. The remaining part of the structure is similar to the corresponding part of the embodiment depicted in FIG. 2, and thus, duplicate descriptions are omitted. In the present embodiment, the frame structures 24 and 26 may be molded using metal or the like. Compared to the embodiment depicted in FIGS. 2 to 5, the present embodiment enables the heater element (20) and the base member (18) to be omitted, allowing simplification of the structure and the manufacturing steps.

Figure 7:
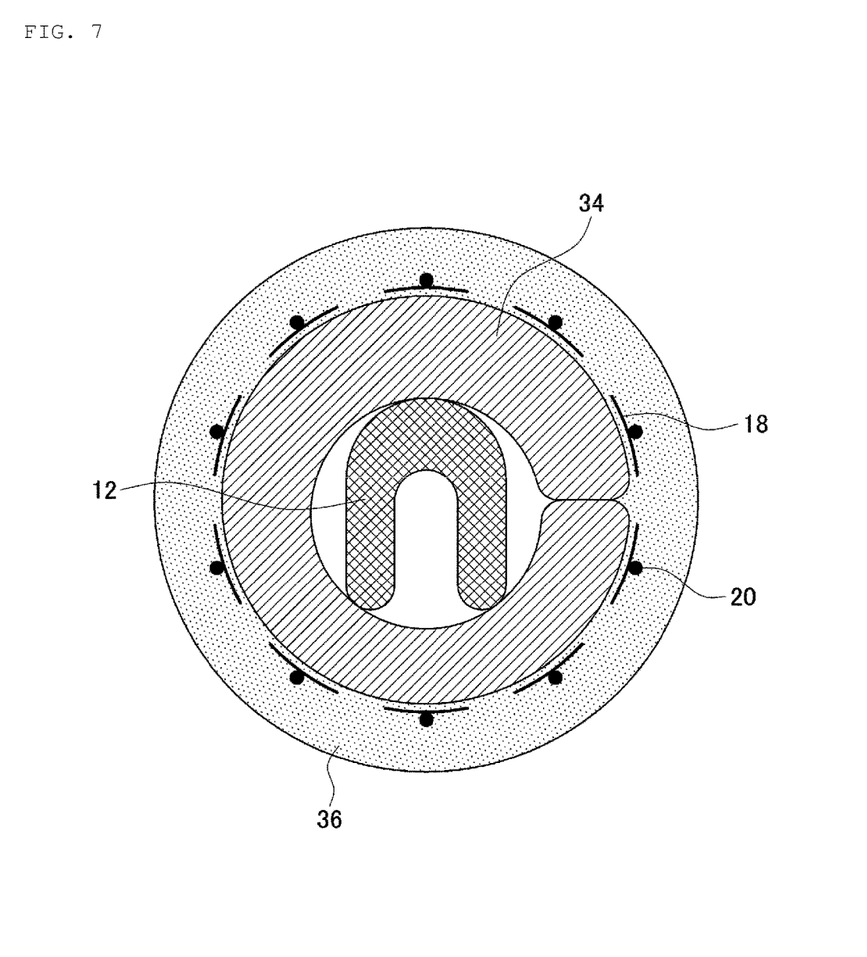
FIG. 7 is a sectional view of a steering wheel according to another embodiment of the present invention, corresponding to a cross section taken along the direction A-A in FIG. 1.

FIG. 7 is a sectional view of a steering wheel according to yet another embodiment of the present invention, and corresponds to a cross section in the direction A-A in FIG. 1. In a structure in the present embodiment, instead of the frame structures, a flexible cushion member 34 is wound around the core 12. The remaining part of the structure is similar to the corresponding part of the embodiment depicted in FIG. 2, and thus, duplicate descriptions are omitted. In the present embodiment, the cushion layer 34 may be molded using a foamed resin, urethane, or the like, and needs sufficient flexibility. In the present embodiment, the core 12 is covered with the resin layer 36 and the cushion layer 34, both of which are flexible, allowing the steering wheel 10 to be made to feel soft to grip. Furthermore, simplified manufacturing steps and reduced material costs can be expected. In the present embodiment, the thickness of the cushion layer 34 enables a sufficient gap to be secured between the core 12 and the heater element 20. Thus, no resin layer is enclosed between the cushion layer 34 and the core 12. Adjustment of the thickness of the cushion layer 34 also enables heat conduction efficiency to be controlled.

The embodiments of the present invention have been described, but the present invention is not limited to the above-described embodiments. Various design changes and the like may be made to the embodiments without departing from the technical scope described in the claims. For example, the present invention is applicable to a steering wheel with a cooler function instead of the heater function.

While the above description constitutes the preferred embodiment of the present invention, it will be appreciated that the invention is susceptible to modification, variation and change without departing from the proper scope and fair meaning of the accompanying claims.

What is claimed is:

1. A steering wheel with a temperature adjusting feature, the steering wheel comprising:
   a core;
   a spacer member comprising a base member arranged around an outer periphery of a rim portion of the core, the base member being formed with a plurality of voids;
   a temperature adjusting element supported by or integrated with the spacer member;
   a resin layer formed to flow into the voids and cover an outside portion of the spacer member, and
   wherein the spacer member separates at least a part of the temperature adjusting element from the core, and wherein the voids are sufficiently large to permit resin to enclose the rim portion.

2. The steering wheel according to claim 1, further comprising wherein the spacer member is a framework-like frame structure, and
   the resin layer is further formed to enter between the core and the spacer member.

3. The steering wheel according to claim 2, further comprising wherein the temperature adjusting element is formed integrally by the frame structure, and
   the temperature adjusting element is a structure that generates heat when an electric current is passed through the frame structure.

4. The steering wheel according to claim 2, further comprising wherein the temperature adjusting element is a heating unit provided outside the frame structure.

5. The steering wheel according to claim 1, further comprising wherein the spacer member is a flexible cushion layer that covers the core,
   the temperature adjusting element is a heating unit provided outside the cushion layer.

6. The steering wheel according to claim 2 further comprising wherein the spacer member is formed of two components assembled together around the core.

7. The steering wheel according to claim 6 further comprising wherein at least one of the two components forming the core have a protruding portion for providing separation between portions of the spacer member and the core.

8. The steering wheel to claim 1 further comprising the spacer member is in the form of a flexible cushion member formed around the core with the temperature adjusting element wrapped around the spacer member.

9. A steering wheel with a temperature adjusting feature, the steering wheel comprising:
   a core;
   a spacer member arranged around an outer periphery of a rim portion of the core, the spacer member comprising a base member being formed with a plurality of voids, the spacer member providing a temperature adjusting element for generating heat when electrical current is passed through the spacer member;
   a resin layer formed to flow into the voids and cover an outside portion of the spacer member; and
   wherein portions of the spacer member are separated from the core, and wherein the voids are sufficiently large to permit resin to enclose the rim portion.

10. The steering wheel according to claim 1 further comprising the core formed of a metal.

11. The steering wheel according to claim 9, further comprising the spacer member is a framework-like frame structure, and the resin layer is further formed to enter between the core and the frame structure.

12. A steering wheel with a temperature adjusting feature, the steering wheel comprising:
   a core;
   a spacer member arranged around an outer periphery of a rim portion of the core, the spacer member comprising a framework-like frame structure;
   a temperature adjusting element supported by or integrated with the spacer member;
   a resin layer formed to cover an outside portion of the spacer member, and the resin layer being formed to flow around the spacer member and enter between the core and the spacer member, and to cover the outside portion of the spacer member,
   wherein the spacer member separates at least a part of the temperature adjusting element from the core.

13. The steering wheel according to claim 12, wherein the temperature adjusting element is formed integrally by the frame structure, and
   the temperature adjusting element is a structure that generates heat when an electric current is passed through the frame structure.

14. The steering wheel according to claim 12, wherein the temperature adjusting element is a heating unit provided outside the frame structure.

15. The steering wheel according to claim 12, wherein the spacer member is a flexible cushion layer that covers the core,
   the temperature adjusting element is a heating unit provided outside the cushion layer.

16. The steering wheel according to claim 12, further comprising wherein the spacer member is formed of two components assembled together around the core.

17. The steering wheel according to claim 16, further comprising wherein at least one of the two components forming the core have a protruding portion for providing separation between portions of the spacer member and the core.

18. The steering wheel to claim 12, further comprising the spacer member is in the form of a flexible cushion member formed around the core with the temperature adjusting element wrapped around the spacer member.

* * * * *